United States Patent
Sakai et al.

(12)

(10) Patent No.: US 6,713,033 B2
(45) Date of Patent: Mar. 30, 2004

(54) PROCESS FOR PRODUCING HYDROPHILIC ODS PACKING MATERIAL MADE OF SILICA GEL

(75) Inventors: Yoshihiro Sakai, Saitama (JP); Yutaka Sawada, Saitama (JP); Norihiro Omori, Saitama (JP); Suzue Ota, Saitama (JP)

(73) Assignee: Kanto Kagaku Kabushiki Kaisha, Tokyo (JP)

( * ) Notice: Subject to any disclaimer, the term of this patent is extended or adjusted under 35 U.S.C. 154(b) by 355 days.

(21) Appl. No.: 09/898,868

(22) Filed: Jul. 3, 2001

(65) Prior Publication Data

US 2002/0032122 A1 Mar. 14, 2002

(30) Foreign Application Priority Data

Jul. 11, 2000 (JP) ........................................ 2000-209829

(51) Int. Cl.⁷ ............................................... C01B 33/12
(52) U.S. Cl. ....................................................... 423/335
(58) Field of Search .......................................... 423/335

(56) References Cited

U.S. PATENT DOCUMENTS 5,134,110 A   7/1992   Sudo et al.

FOREIGN PATENT DOCUMENTS

JP   2611545   5/1997
JP   2818857   10/1998

*Primary Examiner*—Stanley S. Silverman
*Assistant Examiner*—Edward M. Johnson
(74) *Attorney, Agent, or Firm*—Hoffmann & Baron, LLP

(57) ABSTRACT

A process for the production of a highly chemically stable hydrophilic ODS packing material made of silica gel for liquid chromatography that causes hardly any peak tailing. ODS groups are chemically bonded to a silica gel having a specific surface area of 200 to 300 $m^2/g$, which is then subjected once or twice to end capping including high temperature end capping so as to efficiently remove or deactivate active silanol groups.

5 Claims, 5 Drawing Sheets

PROCESS FOR PRODUCING HYDROPHILIC ODS PACKING MATERIAL MADE OF SILICA GEL

This application claims priority from Japanese Application No. JP 2000-209829 filed on Jul. 11, 2000.

BACKGROUND OF THE INVENTION

The present invention relates to a process for the production of a highly chemically stable hydrophilic ODS packing material made of silica gel for liquid chromatography which causes less of the phenomenon of water repellency when using an aqueous eluent.

Octadecylsilyl silica gels (ODS silica gels) are currently widely used as packing materials for high-performance liquid chromatography (HPLC).

Conventional ODS packing material made of silica gels have the defect that the retention time of the target compound for an analysis gradually reduces due to the phenomenon of water repellency, which is believed to be caused by collapse of the ODS group, which is a chemical modifier, (loss of hydrophilicity by changing into a wax) when repeating an analysis using a 100% aqueous eluent, so making it difficult to carry out a chemical analysis.

There has therefore been a strong desire for the development of a highly chemically stable packing material that does not affect the retention time of the target compound for an analysis even when using a 100% aqueous eluent. As a result of an intensive investigation for the purpose of satisfying this desire, an ODS packing material made of silica gel (hydrophilic ODS packing material made of silica gel) that serves the above-mentioned purpose has been developed and is commercially available.

The above-mentioned hydrophilic ODS packing material made of silica gel is produced by a process (end capping) involving chemically modifying the surface silanol groups of silica gel with ODS groups and then bonding short-chain alkyl groups to unreacted silanol groups (active silanol groups), which cause peak tailing and poor reproducibility when HPLC analysis is carried out. Since the active silanol groups strongly interact with, in particular, basic materials, they cause peak tailing when analyzing basic materials.

When producing a hydrophilic ODS packing material made of silica gel that can be used in a 100% aqueous system by the above-mentioned production process, the following three types of technique are employed.

(1) A technique for preventing ODS groups collapse by decreasing the degree of chemical modification of the silica gel with ODS groups so as to maintain the hydrophilicity.
(2) A technique for preventing ODS groups collapse by introducing a hydrophilic functional group so as to maintain the hydrophilicity.
(3) A technique for preventing collapse by changing the stationary phase.

However, hydrophilic ODS packing materials made of silica gel produced with these techniques have the following analytical defects.

That is to say, in the case of the above-mentioned technique (1), since a large amount of active silanol groups (ion-exchangeable silanol) remains, secondary interactions with basic materials are strong so easily causing peak tailing. Moreover, the remaining active silanol groups reduce the chemical stability of the column, particularly, in the alkaline region.

In the case of the above-mentioned technique (2), the elution characteristics (selectivity) depends to a great extent on the type of functional group selected. Furthermore, peak tailing is easily caused not only in the analysis of basic materials, but also in the analysis of acidic materials.

In the case of the above-mentioned technique (3), the collapse of chemically modified groups is prevented by changing the chemical modifying group, for example, by using a silanation agent having a longer carbon chain so as to solidify the packing material. When an organic solvent type eluent is used, the selectivity varies to a greater extent than is in the case with generally used ODS packing materials made of silica gel.

That is to say, the hydrophilic ODS packing materials made of silica gel produced by a process employing any currently available technique cannot necessarily give satisfactory performance when using an aqueous solvent.

For example, an aqueous eluent is ideally used for the HPLC analysis of a hydrophilic compound, but the decrease of the retention performance of the sample with time makes the isolation and the quantitative analysis difficult when using a conventional ODS column. Therefore, in order to prevent these phenomena, an organic solvent type eluent is often employed for the HPLC analysis of a hydrophilic compound. In this case, in order to increase the retention performance of the sample an ion pair reagent is used. Accordingly, an organic solvent is often used as a mobile phase for HPLC at the present time, and this is not desirable in terms of environmental protection.

SUMMARY OF THE INVENTION

It is an object of the present invention to provide a process for producing a highly chemically stable hydrophilic ODS packing material made of silica gel that causes hardly any peak tailing even when using an aqueous eluent, thereby eliminating the above-mentioned defects.

As a result of an intensive investigation by the present inventors in order to achieve the above-mentioned object, it has been found that, with regard to the above-mentioned technique (1), the above-mentioned defects can be eliminated by deactivating the active silanol groups of a silica gel having a smaller surface area than the silica gel used in the prior art by one- or two-step end capping involving high temperature end capping. The present invention has thus been accomplished.

The present invention relates to a process for the production of an ODS packing material made of silica gel, wherein after chemically bonding ODS groups to a silica gel having a specific surface area of 200 to 300 $m^2/g$, the remaining active silanol groups are deactivated by high temperature end capping.

The present invention relates to the above production process of an ODS packing materials made of silica gel, which is characterized in that the high temperature end capping is carried out in a liquid such as liquid paraffin of a temperature range of 200 to 300° C.

At present, the vapor phase method (Japanese Patent No. 2611545, JP, 4 -212058, A and U.S. Pat. No. 5,134,110, A) and the super critical fluid method (Japanese Patent No. 2818857, JP, 9-49829, A) as high temperature end capping technique were reported. Each of them shows the production methods under the special environments. The reactions according to the present invention are carried out in liquid phases, therefore are superior to the former methods also from the viewpoints of economics.

The present invention relates to the above production process of the ODS packing materials made of silica gel, which is characterized in that the high temperature end capping is carried out subsequent to ordinary end capping, which is conducted using toluene or xylene, at the reflux temperature thereof.

The present invention relates to the above production process of the ODS packing materials made of silica gel, wherein the ODS group is one group selected from the group consisting of dimethyloctadecylsilyl group, methyloctadecylsilyl group and octadecylsilyl group.

According to the hydrophilic ODS packing material made of silica gel for HPLC obtained by the production process of the present invention, even when analyzing a basic material using a hydrophilic solvent, a reliable quantitative analysis can be carried out with high chemical stability while suppressing peak tailing.

DETAILED DESCRIPTION OF THE PREFERRED EMBODIMENTS

Since a silica gel having a comparatively small specific surface area has inherently fewer hydroxyl groups that can form active silanol groups compared with a silica gel having a large specific surface area, chemical modification can be carried out with high efficiency. The preferable specific surface area of the silica gel is from 200 to 300 m$^2$/g, and more preferably from 240 to 270 m$^2$/g. When the specific surface area of the silica gel is too small, the amount of hydrocarbon groups becomes too small and the chemical modification efficiency decreases.

It has been found that when a silica gel having a moderate specific surface area is subjected to high temperature end capping, deactivation of the active silanol groups, that is to say, weakening of the interaction between the active silanol groups and a basic material in a sample, can be carried out efficiently. In other words, when a silica gel having a specific surface area of 200 to 300 m$^2$/g is subjected to high temperature end capping, the active silanol groups of a packing material using the silica gel can be deactivated extremely efficiently.

The high temperature end capping can be carried out particularly desirably by heating a silica gel in a liquid paraffin to which trimethylchlorosilane and hexamethyldisilazane have been added at a temperature of 230 to 250° C.

When end capping, which is conducted using toluene or xylene, at the reflex temperature thereof (primary end capping), is carried out after ODS groups have been chemically bonded to the silica gel, the silanol groups capable of hydrogen bond can be removed. When high temperature end capping (secondary end capping) is carried out subsequent to the primary end capping, the influence of active silanol groups can be yet more efficiently eliminated.

With regard to examples of the end capping agent used in the above-mentioned primary end capping, chlorosilane compounds can be cited. For example, end capping can be carried out advantageously in the presence of trimethylchlorosilane and pyridine while heating and refluxing the toluene or xylene used as a solvent.

The chemical modification of silica gel with ODS groups can be desirably carried out using an ODS group such as dimethyloctadecylsilyl group, methyloctadecylsilyl group or octadecylsilyl group as the ODS group that is chemically bonded to the silica gel.

Figure 1A:
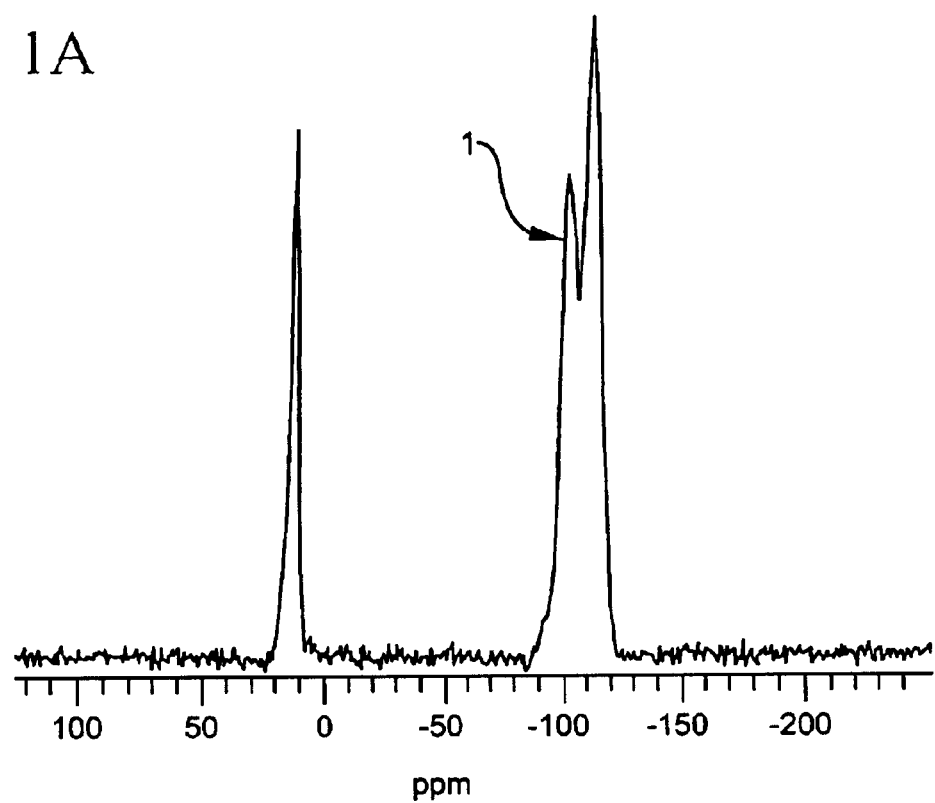
FIG. 1A shows a $^{29}$Si CP/MAS NMR spectrum of a hydrophilic ODS packing material made of silica gel obtained by the production process of the present invention.
Figure 1B:
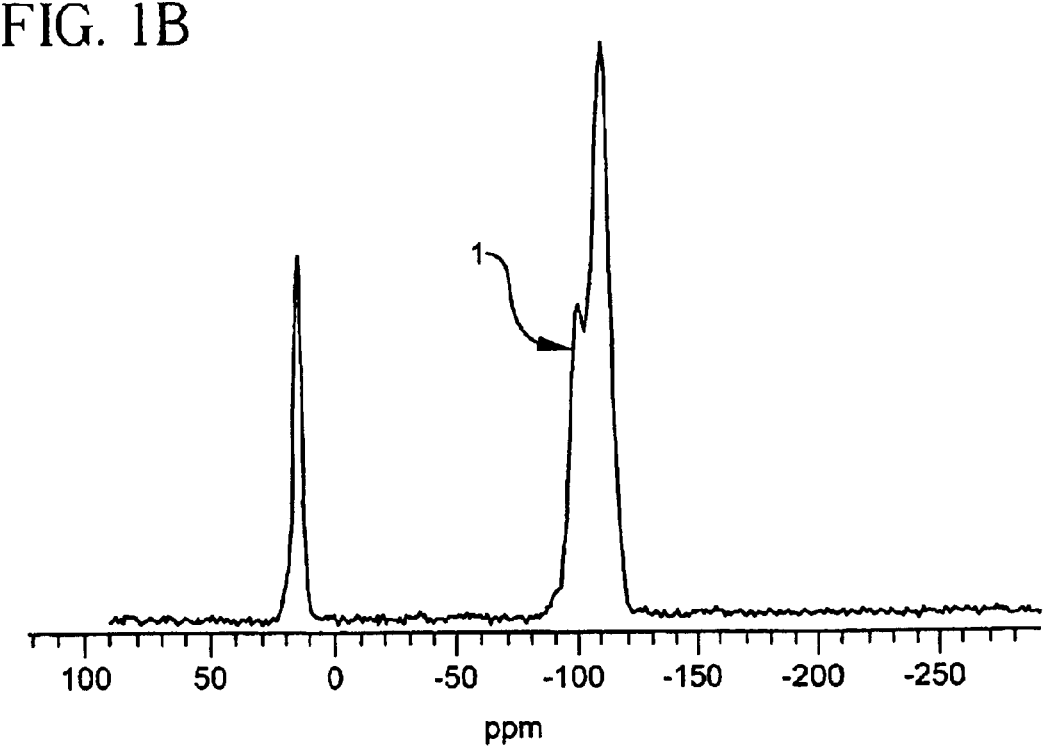
FIG. 1B shows a $^{29}$Si CP/MAS NMR spectrum of an ordinary fully end capped ODS packing material made of silica gel.

As shown in FIG. 1, the ODS packing material made of silica gel obtained by the production process of the present invention has the characteristic that the silanol groups (Peak 1 in FIG. 1) remaining on the silica gel surface of the silanol groups hardly affect peak tailing and chemical stability. The silanol groups remaining on the silica gel surface of the ODS packing material made of silica gel according to the present invention should, therefore, be considered as deactivated silanol groups.

In accordance with the production process of the present invention, the degree of chemical modification of the silica gel with ODS groups can be adjusted so as to be in a range that does not affect the separation, and the hydrophilicity of the ODS packing material made of silica gel can be maintained by leaving only deactivated silanol groups among the remaining silanol groups. As a result, it is possible to produce an ODS packing material made of silica gel that gives stable retention times of samples in HPLC analysis using a 100% aqueous eluent.

The present invention is explained further in detail by the examples below, but the present invention is in no way limited thereby.

EXAMPLES

Example 1

50 g of silica gel produced for liquid chromatography (specific surface area 270 m$^2$/g, pore diameter 13 nm, pore volume 1.1 ml/g) was washed by heating in 200 ml of 6 mol/l hydrochloric acid for 5 hours while refluxing. The silica gel was filtered and then washed with pure water until the filtrate became neutral. Subsequently, the silica gel was washed with acetone and dried at 130° C. for 4 hours.

18 g of the silica gel so washed with hydrochloric acid was dispersed in 200 ml of dried toluene, and 22 g of monochlorodimethyloctadecylsilane and 5 g of pyridine were added to the dispersion and the mixture was heated and refluxed for about 6 hours to synthesize an ODS silica gel. The product was filtered, then washed in turn with 200 ml of tetrahydrofuran and 100 ml of methanol and dried at 130° C. for 4 hours.

The ODS silica gel so obtained was subjected to primary end capping. That is to say, 10 g of the ODS silica gel was heated in toluene, to which 2 g of trimethylchlorosilane and 1.5 g of pyridine had been added, for about 5 hours while refluxing. After the reaction, the product was filtered, then washed in turn with 50 ml of tetrahydrofuran and 50 ml of methanol and dried at 130° C. for 3 hours.

The ODS silica gel so subjected to primary end capping was then subjected to secondary end capping in order to completely deactivate the active silanol groups. That is to say, 10 g of the ODS silica gel was heated in 100 ml of liquid paraffin, to which 1 g of trimethylchlorosilane and 3 g of hexamethyldisilazane had been added, at 230 to 250° C. for 3 hours. After the reaction, 100 ml of hexane was added to the reaction mixture and the resulting mixture was filtered. The residue was washed in turn with 200 ml of tetrahydrofuran and 100 ml of methanol and dried at 130° C for 4 hours.

Experimental Example 1

A stainless steel column having an inner diameter of 4.6 mm and a length of 150 mm was packed with the ODS silica gel of Example 1 by a general slurry method. A sample of a pyridine/phenol mixture was analyzed using this column at a detection wavelength of 254 nm and a 30:70 (v/v) acetonitrile:water as an eluent at a flow rate of 1 ml/min and a measurement temperature of 40° C.

Figure 2:
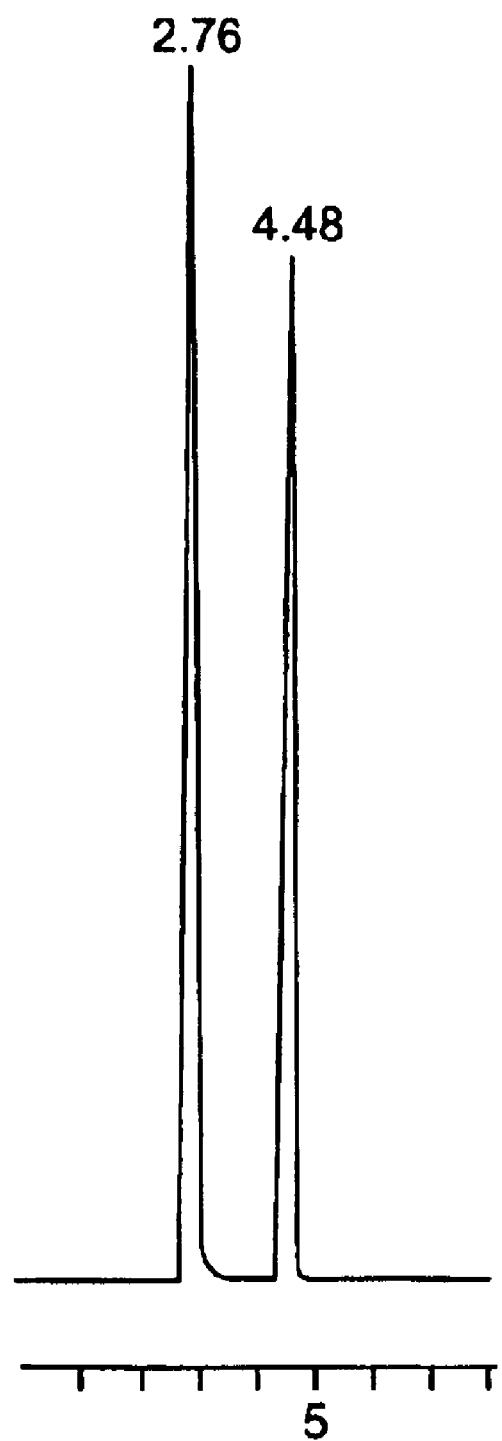
FIG. 2 shows a chromatogram obtained when analyzing a sample of a pyridine/phenol mixture using the column of Example 1.

The chromatogram of the above-mentioned sample showed almost no peak tailing (FIG. 2). Similarly, the same sample was analyzed under the same conditions using a column of a conventional hydrophilic ODS packing material made of silica gel and a column of the ODS packing material made of silica gel obtained at the stage where primary end capping had been completed in Example 1.

Figure 3:
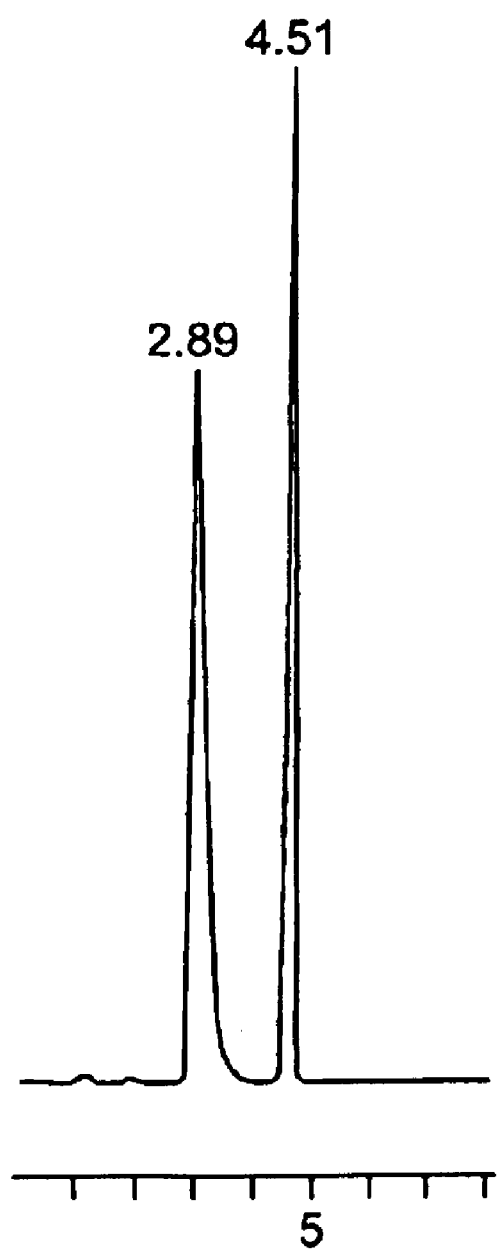
FIG. 3 shows a chromatogram obtained when analyzing a sample of a pyridine/phenol mixture using a conventional ODS packing material made of silica gel.
Figure 4:
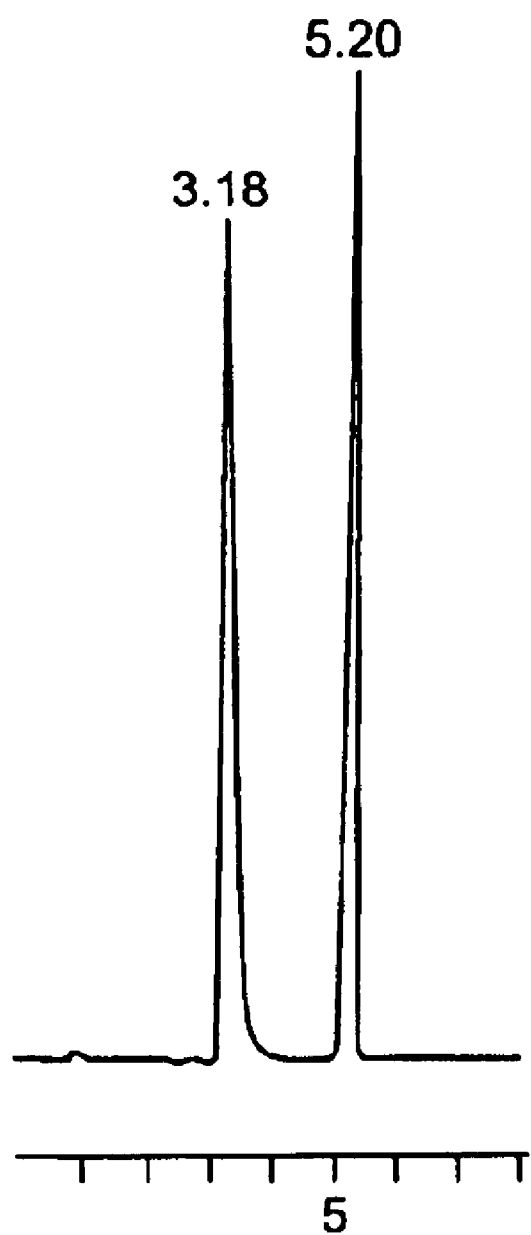
FIG. 4 shows a chromatogram obtained when analyzing a sample of a pyridine/phenol mixture using an ODS packing material made of silica gel prior to secondary end capping.

The result obtained using the conventional hydrophilic ODS packing material made of silica gel is shown in FIG. 3 and the result obtained using the ODS packing material made of silica gel obtained at the stage where primary end capping had been completed is shown in FIG. 4. It can be seen that the peak due to the pyridine which was eluted first tailed in both cases. It is therefore clear that the column using the ODS packing material made of silica gel obtained by the production process of the present invention enables analysis to carry out free from interactions with basic materials.

Experimental Example 2

In order to confirm the characteristics of the hydrophilic ODS packing material made of silica gel, the separation performance between nucleic acids was examined. A column obtained in the same manner as in Experimental Example 1 was used for 2 hours/day on average over 1 month using an aqueous solution of potassium dihydrogenphosphate as the eluent. 5 µl of a liquid mixture of nucleic acids (Peak No. 1 CMP, Peak No. 2 UMP, Peak No. 3 IMP and Peak No. 4 AMP, each at 0.05 mg/ml) was injected under measurement conditions for each chromatogram in which a 5 mmol/l aqueous solution of potassium dihydrogenphosphate was used as the eluent at a flow rate of 0.5 ml/min and a measurement temperature of 35° C. with a detection wavelength of 254 nm.

Figure 5A:
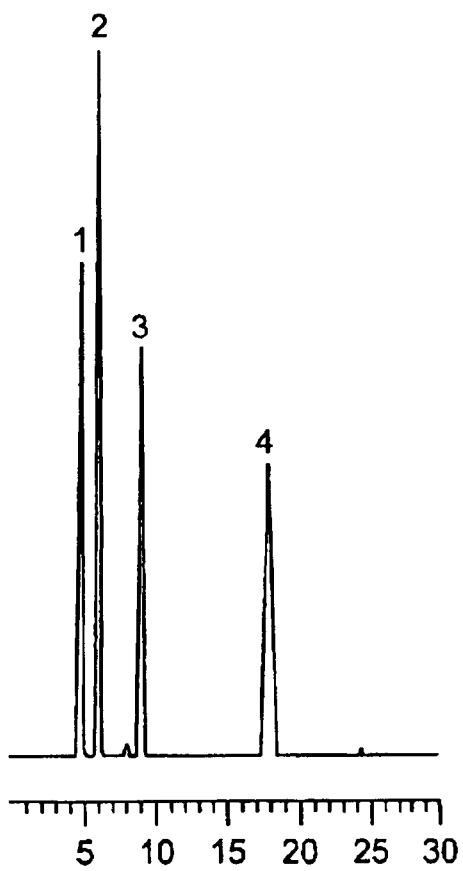
FIG. 5A shows the resolution of the column of Example 1 immediately after starting measurement.
Figure 5B:
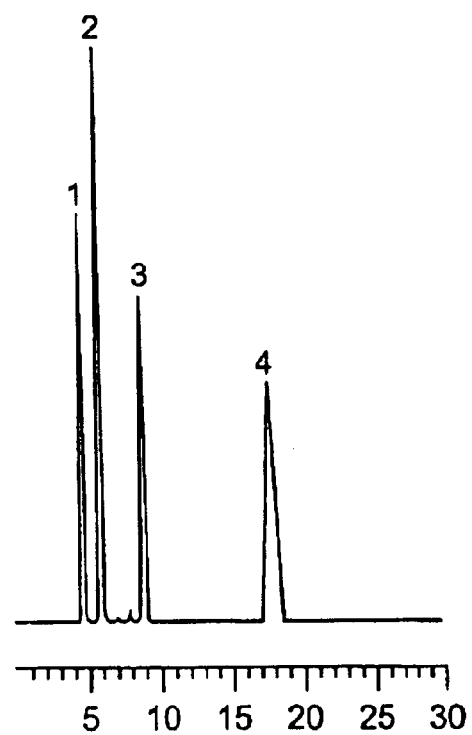
FIG. 5B shows the resolution of the column of Example 1 after 1 month.

It was found as shown in FIG. 5A (immediately after starting the measurement) and FIG. 5B (after 1 month) that the separation performance of the column hardly changed even after 1 month.

Experimental Example 3

In order to confirm the chemical stability of the column, the test was carried out in both acidic and alkaline regions. A 20 mmol/l aqueous solution of phosphoric acid (pH 2.2) was used for the test in the acidic region. It was found that the number of theoretical plates of the column of Example 1 after 500 hours was equal to or greater than 90% of the initial value. A 20 mmol/l aqueous solution of potassium phosphate (pH 8.0) was used for the durability test in the alkaline region. With regard to the chemical stability, it was found that the number of theoretical plates after 300 hours was 90% of the initial value.

The number of theoretical plates was measured using anthracene as a sample and a 75:25 (v/v) acetonitrile:water as an eluent at a flow rate of 1.0 ml/min. and a temperature of 40° C. with a detection wavelength of 254 nm.

Using the columns packed with a conventional hydrophilic ODS packing material made of silica gel and in the same manner as in Example 1 with an ODS packing material made of silica gel obtained at the stage where primary end capping had been completed in Example 1, the sample was analyzed.

In the case of measurement under alkaline (pH 8.0) conditions, the number of theoretical plates of the column packed with the conventional ODS packing material made of silica gel decreased to 65% of the initial value after about 70 hours. The number of theoretical plates of the column packed with the ODS packing material made of silica gel prior to secondary end capping decreased to 20% of the initial value or less after 70 hours. The test results of the chemical stability of these columns in the alkaline region are compared in Table 1.

TABLE 1

| | Chemical stability tests using an alkaline eluent (change in the number of theoretical plates) (%) | | | | | | | | | |
|---|---|---|---|---|---|---|---|---|---|---|
| Testing time (h) | 0 | 25 | 50 | 70 | 100 | 150 | 200 | 250 | 300 | 350 |
| Product according to the invention | 100 | 101 | 99 | 100 | 99 | 99 | 100 | 97 | 92 | 86 |
| Conventional product | 100 | 99 | 101 | 65 | — | — | — | — | — | — |
| Product after primary end capping | 100 | 101 | 90 | 18 | — | — | — | — | — | — |

The number of theoretical plates at a time of 0 hours was defined as 100%.

It is clear from the results above that the ODS packing material made of silica gel according to the production process of the present invention has an extremely high chemical stability.

It is also clear from the results above that the column packed with the ODS packing material made of silica gel obtained by the production process of the present invention has excellent chemical stability compared with the column packed with the conventional hydrophilic ODS packing material made of silica gel and that the secondary end capping greatly contributes to this excellence.

Embodiments of the present invention have been described in detail above, but the present invention can be modified in a variety of ways without departing from the spirit and scope of the appended claims.

What is claimed is:

1. A process for the production of an ODS packing material made of silica gel comprising steps of:

chemically bonding ODS groups to a silica gel having a specific surface area of 200 to 300 m$^2$/g; and then deactivating the remaining active silanol groups by high temperature end capping.

2. The production process of ODS packing material made of silica gel according to claim 1, wherein the high temperature end capping is carried out in the liquid phase of a temperature range of 200 to 300° C.

3. The production process of ODS packing material made of silica gel according to claim 1, wherein the high temperature end capping is carried out subsequent to ordinary end capping, which is conducted using toluene or xylene, at the reflux temperature thereof.

4. The production process of ODS packing material made of silica gel according to claim 1, wherein the ODS group is one or more groups selected from the group consisting of dimethyloctadecylsilyl group, methyloctadecylsilyl group and octadecylsilyl group.

5. The production process of ODS packing material made of silica gel according to claim 1, wherein the high temperature end capping is carried out subsequent to ordinary end capping, which is conducted using toluene or xylene, at the reflux temperature thereof, and wherein the ODS group is one or more groups selected from the group consisting of dimethyloctadecylsilyl group, methyloctadecylsilyl group and octadecylsilyl group.

* * * * *